United States Patent [19]

Booher

[11] Patent Number: 5,156,787
[45] Date of Patent: Oct. 20, 1992

[54] PULTRUSION METHOD OF MAKING BRAKE LININGS

[76] Inventor: Benjamin V. Booher, 1721 Aldergate, Leucadia, Calif. 92024

[21] Appl. No.: 647,137

[22] Filed: Jan. 29, 1991

[51] Int. Cl.$^5$ ............................................. B32B 1/10
[52] U.S. Cl. ................................. 264/135; 156/180; 264/137; 264/156
[58] Field of Search ............... 156/180, 181; 264/135, 264/136, 137, 156

[56] References Cited

U.S. PATENT DOCUMENTS

| | | | |
|---|---|---|---|
| 4,244,994 | 1/1981 | Trainor et al. | 156/180 |
| 4,432,922 | 2/1984 | Kaufman et al. | 264/122 |
| 4,892,600 | 1/1990 | Beever | 156/166 |
| 5,026,447 | 6/1991 | O'Connor | 156/166 |

*Primary Examiner*—Tim Heitbrink
*Attorney, Agent, or Firm*—Baker, Maxham, Jester & Meador

[57] ABSTRACT

A continuous process for the manufacture of friction units includes the steps of impregnating a plurality of strands of reinforcing fibers with a thermoplastic material, pulling the impregnated strands of reinforcing fibers through a composite forming die for forming a body having the peripheral configuration of the friction units, and selectively cutting the body into a plurality of the friction units.

9 Claims, 1 Drawing Sheet

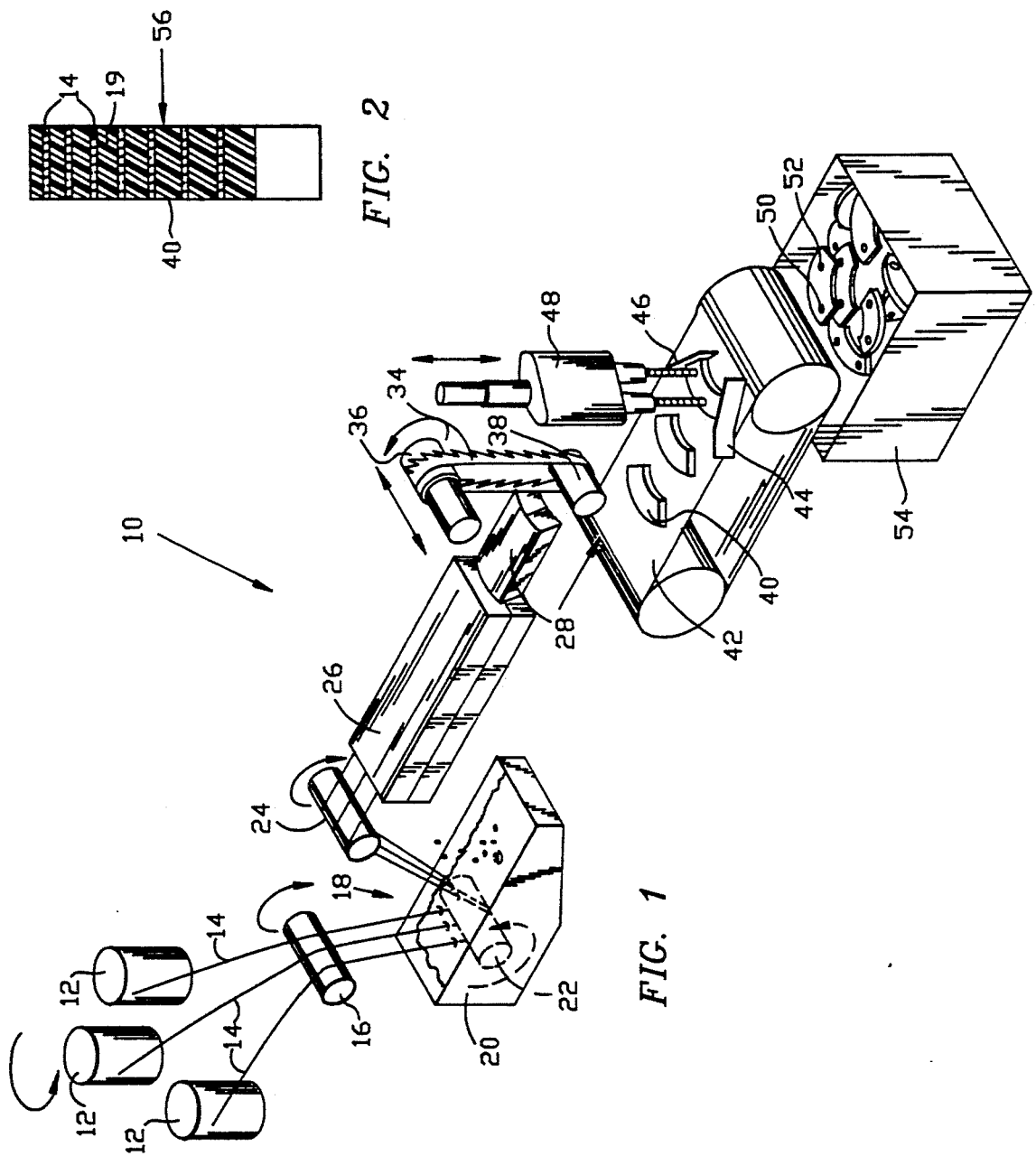

5,156,787

PULTRUSION METHOD OF MAKING BRAKE LININGS

BACKGROUND OF THE INVENTION

The present invention relates to brake pads and linings and pertains particularly to an improved method and composition for making same.

Until recent years, the predominant material used in the manufacture of friction pads and discs for brakes, clutches and the like was asbestos. However, it was discovered that asbestos is a carcinogenic substance, and that such use released potentially harmful amounts of it into the environment. Extensive efforts have been put forth in an effort to find suitable environmentally safe materials having the desirable wear and heat resistant characteristics as asbestos.

Attempts to satisfy the need for long life, high friction heat resistant materials have included proposals to utilize various chopped fibers molded in a bonding matrix, such as a resin. The friction unit is formed by a molding process, with the fibers randomly oriented. However, friction units made by this method are expensive to manufacture and have not been satisfactory.

It is desirable that improved methods and compositions be available for the manufacture of friction units.

SUMMARY AND OBJECTS OF THE INVENTION

It is the primary object of the present invention to provide improved brake pads and linings and method of making same.

In accordance with a primary aspect of the present invention, a continuous process for the manufacture of friction units comprises the steps of impregnating a plurality of strands of reinforcing fibers with a thermoplastic material, pulling the impregnated strands of reinforcing fibers through a composite forming die for forming a body having the peripheral configuration of the friction units, and selectively cutting the body into a plurality of the friction units.

BRIEF DESCRIPTION OF THE DRAWING

The above and other objects and advantages of the present invention will become apparent from the following description when read in conjunction with the accompanying drawings wherein:

FIG. 1 is a perspective view schematically illustrating an apparatus and a preferred method of carrying out the invention; and FIG. 2 is a detailed sectional view of a brake pad in accordance with the invention.

DETAILED DESCRIPTION OF A PREFERRED EMBODIMENT

Referring to FIG. 1 of the drawing, there is schematically illustrated a system for carrying out the invention and the process of the invention. The system, designated generally by the numeral 10, comprises a plurality of creels 12 from which a plurality of strands 14 of an elongated continuous fiber are drawn and passed across suitable guide rollers or bars 16 to a resin bath 18. The fibers 14 pass through the bath into or through a bath of a suitable resin contained within a reservoir 20 for impregnating the fibers or strands. The strands 14 are guided beneath suitable guide roller or means 22 and over the guide roller 24 and into a die 26. The impregnated strands are passed through the die 26 where they are shaped into and emerge from the die in the form of a bar or block 28 having the peripheral configuration of the brake pad or other article being manufactured. The bar or block 28 is forced or pulled from the die 26 by suitable means, such as rollers or the like and positioned to be cut into individual brake pad pieces in the illustrated embodiment.

In the illustrated embodiment, a suitable saw apparatus, such as a band saw 34 supported on its pulleys or rollers 36 and 38 is movable transverse to the axis or movement of the bar 28 for sawing the bar into a plurality of brake pads 40. The cut surface represents the friction surface, where the length of the fibers are preferably substantially normal or perpendicular to this surface. It may be desirable in some instances to provide a slight angularity to the fibers in relation to the friction surface. This can be accomplished by cutting the friction units from the bar at the desired angle to the axis thereof. Other suitable cutting apparatus may be utilized, such as water, laser, abrasive or other means. The brake pads fall onto a conveyer belt 42 and are moved into position held by a jig or fixture 44, 46 for operation of a punch or drill press 48 for forming mounting holes 50 and 52 on the brake pads. The pads are then accumulated in a suitable storage container or bin 54, where they are then packaged and shipped.

The reinforcing fibers 14 for the brake pads or linings are preferably glass fiber but may contain other materials and fibers or combinations thereof. In addition, other fibers may be woven in with the glass fibers in various selected proportions. For example, various fibers and combinations may be utilized, including but not limited to glass, rock wool, ceramic, carbon, graphite, aramide, and fibers of other organic and inorganic materials. Various metallic fibers may also be utilized in various proportions with non-metallic fibers. The arrangement, as illustrated, provides for the controlled orientation of the fibers as well as the controlled density of the fibers within the resin matrix. The composition of the friction device determines many of its characteristics, such as its durability, heat resistance, and friction resistance. With this process, the fibers may be controllably oriented uniformly at an angle substantially normal to the friction surface of the brake pad or friction device.

The resin material may be any suitable resin that is either a thermoplastic material or it may be a material requiring other forms of curing. It may be cured for example by cooling or by the use of UV or other radiation or the like. The resin material may, for example, be a suitable polyester and may have components such as powders of graphite or other material to aid in the dissipation of heat. For example, a one to about three percent by weight of graphite powder uniformly distributed through the resin material aids in the dissipation of heat. Alternate compositions may include small amounts of other materials, such as non-ferrous metallic powders, such as copper or the like. For example, a one to three percent by weight copper powder may also be utilized to enhance the dissipation of heat.

Referring to FIG. 2, a section view through a brake pad 40 is illustrating glass fibers 14 in a matrix of resin material 19. The fibers 14 are shown substantially perpendicular to a friction surface 56 of the brake pad 40. Other friction devices, such as brake shoes and clutch pads, would preferably have similarly oriented strands or fibers. The density and mixture of fibers may be varied to suit the particular application.

While brake pads are illustrated in the process, it is apparent that clutch friction pads and brake shoe type of pads may also be manufactured by this process. The die is set to shape the emerging articles, such that the fibers are oriented uniformly at an angle preferably normal to the friction surface.

The articles may be cut from the pultruded bar by any suitable means, such as by laser, water or other means. The present method and process provides a highly efficient manufacturing process for the production of high quality friction units that are asbestos free. The pultrusion process enables the careful control of fiber density, mixture, and orientation on a continuous basis.

While the pultrusion process is preferred, the articles may also be made by the filament winding process. By this process, strands or filaments are wound on or into compression mold cavities, forming slabs which can then be cut into the friction units.

While I have illustrated and described my invention by means of specific embodiments, it should be understood that numerous changes and modifications may be made therein without departing from the spirit and scope of the invention, as defined in the appended claims.

I claim:

1. A continuous process for the manufacture of friction units comprising the steps of:
   impregnating a plurality of strands of reinforcing fibers with a resin material;
   pulling said impregnated strands of reinforcing fibers into a composite forming die for forming a body having the peripheral configuration of said friction units;
   solidifying said body by curing said resin; and
   forming a plurality of friction units and a friction surface on each of said friction units by selectively cutting said body transverse to the length of said strands into a plurality of said friction units, so that said friction surface is normal to the length of said strands.

2. A continuous process according to claim 1 wherein said reinforcing fibers are predominately glass fibers.

3. A continuous process according to claim 1 wherein said resin material is a thermosetting resin.

4. A continuous process according to claim 1 wherein said resin material is a thermosetting resin having about three percent by weight of graphite powder.

5. A continuous process according to claim 1 wherein said resin material is a thermosetting resin having about three percent by weight of graphite powder and about one percent by weight of copper powder.

6. A continuous process for the continuous manufacture of composite friction units comprising the steps of:
   selecting and impregnating a plurality of elongated strands of reinforcing fibers with a resin material;
   pulling said impregnated strands of reinforcing fibers in a predetermined alignment through a composite forming die for forming a body having the peripheral configuration of said friction units;
   solidifying said body by curing said resin; and
   forming a plurality of friction units having a friction surface by selectively cutting said body at least along one path defining a friction surface transverse to the length of said strands into a plurality of said friction units.

7. A continuous process according to claim 6 wherein said reinforcing fibers are predominately glass fibers.

8. A continuous process according to claim 7 wherein said reinforcing fibers are selected from the group consisting essentially of glass, rock wool, ceramic, carbon, and aramide.

9. A continuous process according to claim 8 wherein said resin is selected from the group consisting essentially of vinyl esters and epoxies and is impregnated with powders selected from the group consisting essentially of graphite, copper, brass, iron, and rubber in selected quantities.

* * * * *